Nov. 8, 1938.     S. E. BOUCHARD     2,135,792
OPHTHALMIC MOUNTING
Filed Dec. 11, 1936

SAMUEL E. BOUCHARD
INVENTOR.

BY
ATTORNEYS

Patented Nov. 8, 1938

2,135,792

UNITED STATES PATENT OFFICE 2,135,792

OPHTHALMIC MOUNTING

Samuel E. Bouchard, Rochester, N. Y., assignor to Bausch & Lomb Optical Company, Rochester, N. Y., a corporation of New York Application December 11, 1936, Serial No. 115,379

3 Claims. (Cl. 88—41)

This invention relates to ophthalmic mountings and has for its chief object the provision of an ophthalmic mounting which will be relatively rigid and sturdy in structure yet neat and pleasing in appearance. Another object is to provide improved bracing means adjacent the bridge connections of a spectacle frame. These and other objects and advantages reside in certain novel features of construction, arrangement and combination of parts as will hereinafter be more fully described and pointed out in the appended claims.

Referring to the drawing.

Figures 3, 4:
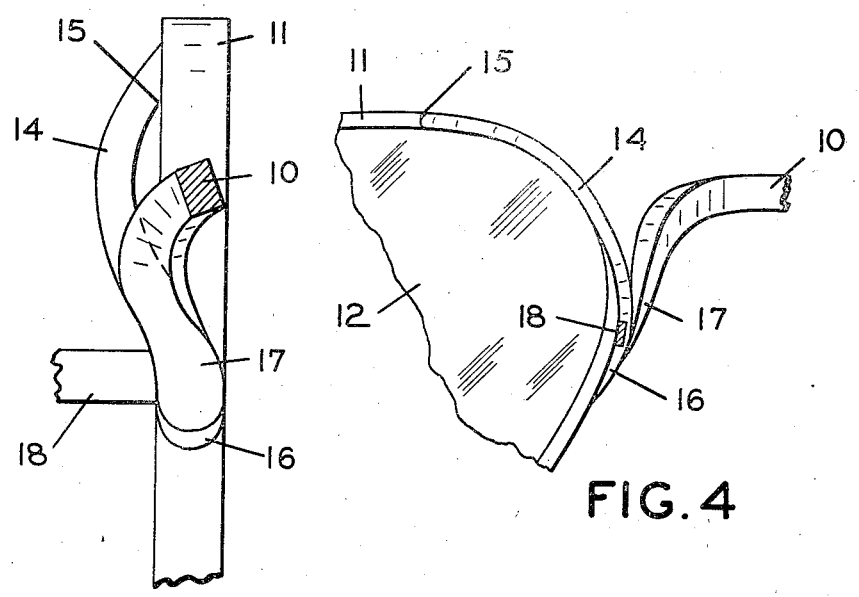
Fig. 3 is a fragmentary side view with the bridge in section.
Fig. 4 is a fragmentary rear view of the structure in Fig. 1.

A preferred embodiment of my invention is disclosed in the drawing wherein there is shown a spectacle frame comprising the bridge 10 which connects the two eyewires 11 holding lenses 12. The eyewires 11 are supplied with the usual split end pieces 13 adapted to receive temples in the usual manner. A brace member 14 has one end attached, as at 15, to the rear top side of each eyewire 11 from where it extends rearwardly and downwardly and substantially follows the contour of the eyewire, as clearly shown in Fig. 4. It then extends forwardly and has its other end attached, as at 16, to the nasal face of the eyewire. The downwardly projecting ends 17 of bridge 10 are attached to the lower portions of the brace members 14 as shown in the drawing. A rearwardly projecting arm 18 carrying nose pad 19 is also secured to each eyewire.

Figure 1:
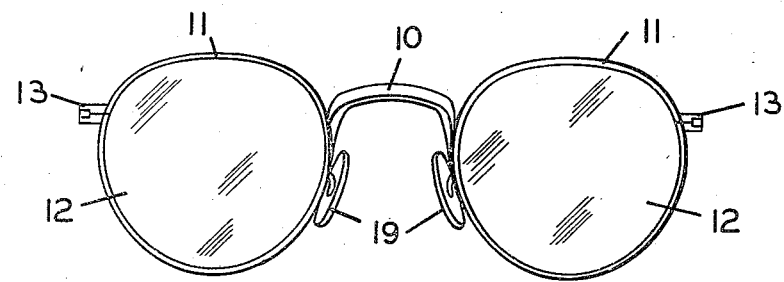
Fig. 1 is a front view of an ophthalmic mounting embodying my invention.
Figure 2:
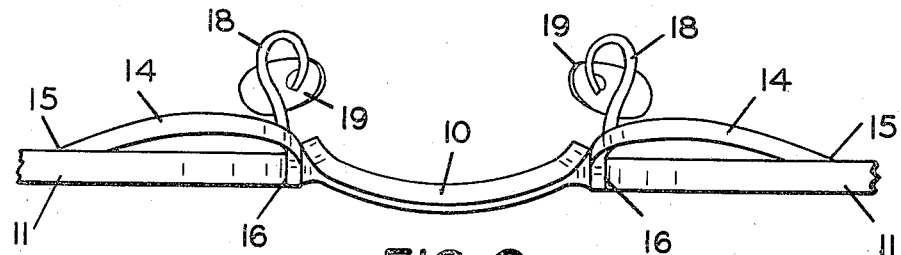
Fig. 2 is a fragmentary top plan view thereof.

From the foregoing it will be apparent that I am able to attain the objects of my invention and provide an improved ophthalmic frame or mounting having simple, yet efficient, bracing means. It will be obvious that the bracing means strengthens the frame so that the various parts of the structure cannot readily be twisted or bent out of shape and alignment. It is to be noted that I have accomplished this efficient bracing by means which does not produce a clumsy or ill-appearing frame. In fact, the bracing members are practically invisible when the frame or mounting is viewed from the front as in Fig. 1.

Although the drawing shows the attachment of the bracing members to a full-rimmed spectacle frame, it is obvious that they could also be applied to a semi-rimmed construction. Various other modifications can obviously be made without departing from the spirit of my invention.

I claim:

1. An ophthalmic mounting comprising a pair of lens holding devices, each of said devices having a rim portion extending along the upper and nasal edges of a lens held therein, each of said portions having a face which is substantially perpendicular to the plane of the lens and a rear side, a brace member on each portion, each member being secured to and extending rearwardly from the rear side of the portion and thence downwardly and forwardly to a connection with the face of the nasal part of said portion, and a bridge having its ends secured, respectively, to said brace members.

2. An ophthalmic mounting comprising a pair of lens holding devices, a bridge connecting said devices, each of said devices having a portion extending along the top edge and a portion on the nasal edge of a lens, a relatively rigid elongated brace member on each of said devices adjacent the connections between the bridge and said devices, each brace member having one end secured to the rear top side of one portion and extending rearwardly and downwardly and terminating in a connection with the nasal face of the other portion, each member being curved so as to substantially follow the contour of the portions.

3. In an ophthalmic mounting, the combination of a device for holding a lens, said device having a portion extending along the top and nasal edges of a lens held therein, a relatively rigid elongated brace member, the upper end of said member being secured to said portion at the upper edge of the lens, the lower end of said member being secured to said portion at the nasal edge of the lens, said member being curved and extending rearwardly and downwardly from its upper end and thence forwardly to its lower end and substantially following the contour of said portion and a bridge connected to the lower end of said member.

SAMUEL E. BOUCHARD.